(12) United States Patent
Choi et al.

(10) Patent No.: US 12,354,388 B2
(45) Date of Patent: Jul. 8, 2025

(54) ELECTRONIC DEVICE AND METHOD FOR IMAGE SEGMENTATION

(71) Applicant: SAMSUNG ELECTRONICS CO., LTD., Suwon-si (KR)

(72) Inventors: Jongbum Choi, Suwon-si (KR); Youngjo Kim, Suwon-si (KR); Hyunhee Park, Suwon-si (KR); Hyungju Chun, Suwon-si (KR); Changsu Han, Suwon-si (KR); Jonghun Won, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 360 days.

(21) Appl. No.: 17/741,905

(22) Filed: May 11, 2022

(65) Prior Publication Data

US 2022/0358776 A1 Nov. 10, 2022

Related U.S. Application Data

(63) Continuation of application No. PCT/KR2022/006408, filed on May 4, 2022.

(30) Foreign Application Priority Data

May 7, 2021 (KR) .......................... 10-2021-0059245

(51) Int. Cl.
*G06V 20/70* (2022.01)
*G06T 7/11* (2017.01)
(Continued)

(52) U.S. Cl.
CPC ............... *G06V 20/70* (2022.01); *G06T 7/11* (2017.01); *G06T 7/136* (2017.01); *G06V 10/25* (2022.01); *G06T 2207/20081* (2013.01)

(58) Field of Classification Search
CPC ........ G06V 20/70; G06V 10/25; G06T 7/136; G06T 7/11; G06T 2207/20081; G06T 2207/20084; G06T 7/10–194
See application file for complete search history.

(56) References Cited

U.S. PATENT DOCUMENTS 8,175,376 B2 * 5/2012 Marchesotti ...... G06F 18/24155
382/282
8,526,674 B2 * 9/2013 Patti ...................... G06V 20/49
382/103

(Continued)

FOREIGN PATENT DOCUMENTS

CN 108875519 A 11/2018
CN 111862124 A * 10/2020

(Continued)

OTHER PUBLICATIONS

Martin Lukac, Michitaka Kameyama, Kosuke Hiura, "Natural image understanding using algorithm selection and high-level feedback," (2013). Proc. SPIE 8662, Intelligent Robots and Computer Vision XXX: Algorithms and Techniques, 86620D (Feb. 4, 2013); https://doi.org/10.1117/12.2008593 (Year: 2013).*

(Continued)

*Primary Examiner* — Vu Le
*Assistant Examiner* — Jack Peter Kraynak
(74) *Attorney, Agent, or Firm* — Sughrue Mion, PLLC

(57) ABSTRACT

According to an embodiment of the specification, disclosed is an electronic device that obtains an image by using a camera, identifies an object-of-interest among a plurality of objects included in the image, determines a selected segmentation model among a plurality of segmentation models based on a size of the object-of-interest and apply the determined segmentation model to a region of interest (ROI) of the image containing the object-of-interest is disclosed.

14 Claims, 9 Drawing Sheets

(51) Int. Cl.
    *G06T 7/136*        (2017.01)
    *G06V 10/25*        (2022.01)

(56) References Cited

U.S. PATENT DOCUMENTS

| | | | |
|---|---|---|---|
| 8,914,184 | B2 | 12/2014 | McQuade et al. |
| 10,061,745 | B2 | 8/2018 | McQuade et al. |
| 10,289,651 | B2 | 5/2019 | McQuade et al. |
| 10,467,760 | B2 * | 11/2019 | Kim .................. G06N 3/045 |
| 11,763,542 | B2 * | 9/2023 | Liu .................... G06V 10/26 |
| | | | 382/156 |
| 2021/0201066 | A1 * | 7/2021 | Cui ..................... G06N 3/04 |
| 2021/0312635 | A1 * | 10/2021 | Price .................. G06T 7/194 |
| 2021/0383549 | A1 * | 12/2021 | Wang .................. G06V 10/26 |
| 2021/0397890 | A1 | 12/2021 | Kim et al. |
| 2022/0215201 | A1 * | 7/2022 | Dwivedi .............. G06N 3/045 |
| 2022/0237799 | A1 * | 7/2022 | Price .................. G06T 7/174 |

FOREIGN PATENT DOCUMENTS

| | | | | |
|---|---|---|---|---|
| CN | 112150499 | A | * | 12/2020 |
| CN | 110390251 | B | * | 9/2022 ......... G06F 17/2785 |
| KR | 10-1417402 | B1 | | 7/2014 |
| KR | 10-2020-0052440 | A | | 5/2020 |
| KR | 10-2020-0112646 | A | | 10/2020 |
| KR | 10-2021-0052770 | A | | 5/2021 |
| KR | 10-2397544 | B1 | | 5/2022 |
| WO | WO-2012035488 | A1 | * | 3/2012 ............ G06T 15/08 |

OTHER PUBLICATIONS

Martin Lukac, Michitaka Kameyama, and Kosuke Hiura "Natural image understanding using algorithm selection and high-level feedback", Proc. SPIE 8662, Intelligent Robots and Computer Vision XXX: Algorithms and Techniques, 86620D (Feb. 4, 2013); https://doi.org/10.1117/12.2008593 (Year: 2013).*

G. Venturi, P. Capitani and M. Carbone, "A target-oriented adaptive segmentation method," 1992 14th Annual International Conference of the IEEE Engineering in Medicine and Biology Society, Paris, France, 1992, pp. 1928-1929, doi: 10.1109/IEMBS.1992.5762104. (Year: 1992).*

Y. -H. Huang, M. Proesmans, S. Georgoulis and L. Van Gool, "Uncertainty based model selection for fast semantic segmentation," 2019 16th International Conference on Machine Vision Applications (MVA), Tokyo, Japan, 2019, pp. 1-6, doi: 10.23919/MVA.2019.8757930. (Year: 2019).*

H. Wang, D. Huang, K. Jia and Y. Wang, "Hierarchical Image Segmentation Ensemble for Objectness in RGB-D Images," in IEEE Transactions on Circuits and Systems for Video Technology, vol. 29, No. 1, pp. 93-103, Jan. 2019, doi: 10.1109/TCSVT.2017.2776220. (Year: 2019).*

Caesar et al., "Region-based semantic segmentation with end-to-end training", Jul. 26, 2016, arXiv:1607.07671v1 [cs.CV], https://arxiv.org/pdf/1607.07671.pdf, (18 total pages).

International Search Report (PCT/ISA210 and PCT/ISA/220) and Written Opinion (PCT/ISA/237) issued Aug. 12, 2022 by the International Searching Authority in International Application No. PCT/KR2022/006408.

* cited by examiner

ELECTRONIC DEVICE AND METHOD FOR IMAGE SEGMENTATION

CROSS REFERENCE TO RELATED APPLICATIONS

The application is a bypass continuation of PCT/KR2022/006408 filed in the Korean Intellectual Property Office (KIPO) on May 4, 2022 and claims benefit of priority to KR 10-2021-0059245 filed in KIPO on May 7, 2021.

TECHNICAL FIELD

The disclosure relates to an electronic device and an operating method of the electronic device, and, more particularly, relates to an electronic device that performs segmentation by using a neural network and an operating method of the electronic device.

BACKGROUND ART

Nowadays, with the development of artificial intelligence (AI) technology, a terminal including AI has been spread. Furthermore, electronic devices may support various shooting mode by using cameras.

The AI may recognize an object in an image captured in the various shooting modes and may perform segmentation that separates the object from details in the image. The AI may recognize people or animals in an image, may generate a segmentation map, and may separate a subject.

The AI may apply an effect of separating the subject depending on an area by using the separated map.

DISCLOSURE

Technical Problem

The disclosure is to provide a method and apparatus for improving segmentation performance executed by an electronic device.

The disclosure is to provide a method and apparatus for improving segmentation performance by using only a specific segmentation model among a plurality of segmentation models divided depending on a level of a label in performing segmentation.

The disclosure is to provide a method and apparatus for improving segmentation performance by driving only a specific segmentation model among a plurality of segmentation models driven based on a size of an object in an image.

The disclosure is to provide a method and apparatus for minimizing memory use and improving segmentation performance by using only a specific segmentation model among a plurality of segmentation models divided depending on a level of a label.

Technical Solution

Disclosed herein is an electronic device including a camera; a processor operatively connected to the camera; and a memory operatively connected to the processor. The memory stores instructions that, when executed, cause the processor to obtain an image by using the camera; identify an object-of-interest among a plurality of objects included in the image; determine a selected segmentation model among a plurality of segmentation models based on a size of the object-of-interest; and apply the selected segmentation model to a region of interest (ROI) of the image containing the object-of-interest.

Also provided herein is a method performed by an electronic device, the method including when a process for a memory included in the electronic device or connected to the electronic device is executed, obtaining an image by using a camera included in the electronic device or connected to the electronic device; identifying an object-of-interest among an object included in the image; determining a selected segmentation model among a plurality of segmentation models based on a size of the object-of-interest; and applying the selected segmentation model to a region of interest (ROI) of the image containing the object-of-interest.

Advantageous Effects

According to embodiments of the disclosure, it is possible to provide a method and apparatus for improving segmentation performance executed by an electronic device.

According to embodiments of the disclosure, it is possible to provide a method and apparatus for improving segmentation performance by using only a specific segmentation model among a plurality of segmentation models divided depending on a level of a label in performing segmentation.

According to embodiments of the disclosure, it is possible to provide a method and apparatus for improving segmentation performance by driving only a specific segmentation model among a plurality of segmentation models driven based on a size of an object in an image.

According to embodiments of the disclosure, it is possible to provide a method and apparatus for minimizing memory use and improving segmentation performance by using only a specific segmentation model among a plurality of segmentation models divided depending on a level of a label.

With regard to description of drawings, the same or similar components will be marked by the same or similar reference signs.

DETAILED DESCRIPTION

Figure 1:
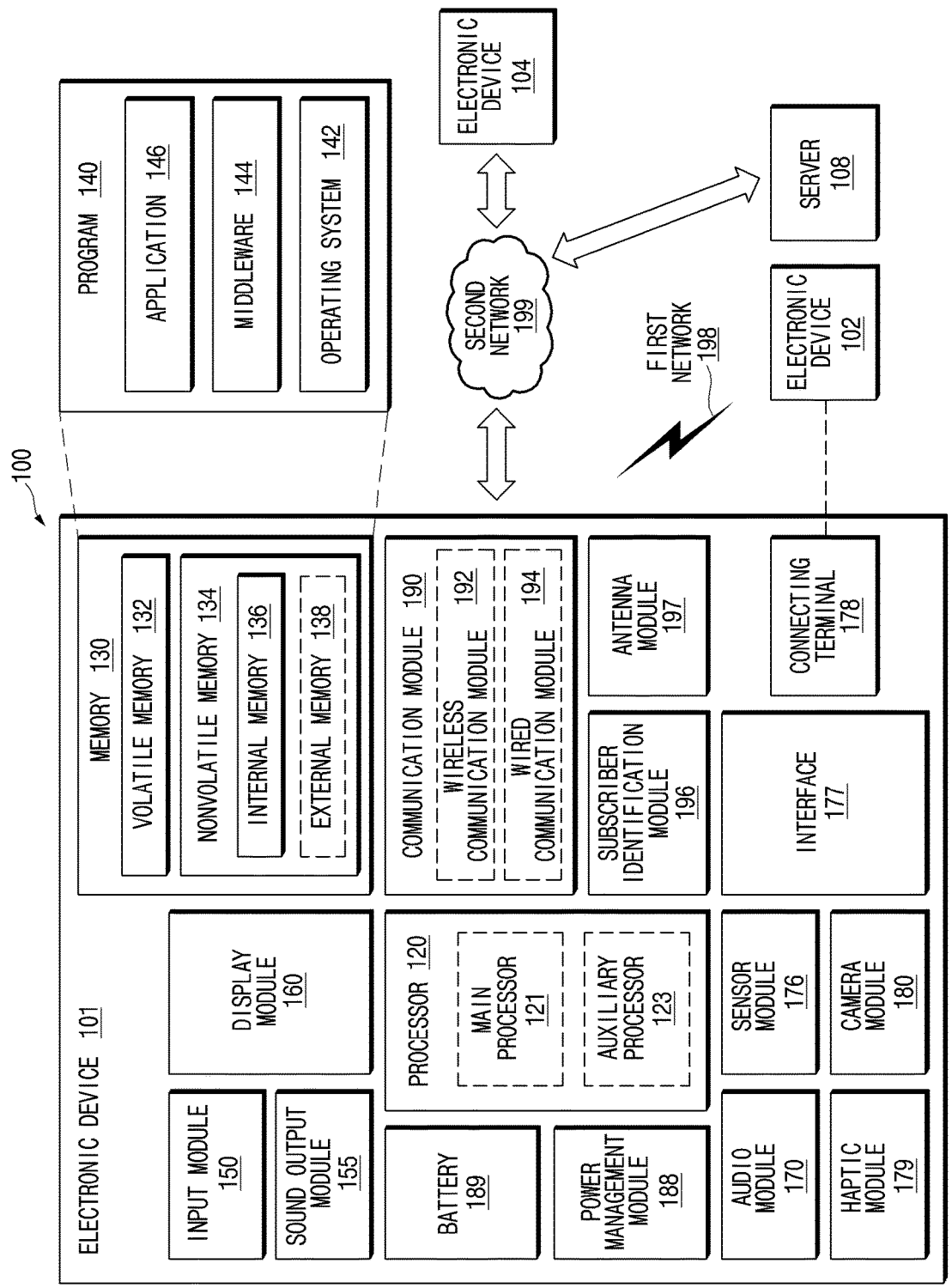
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
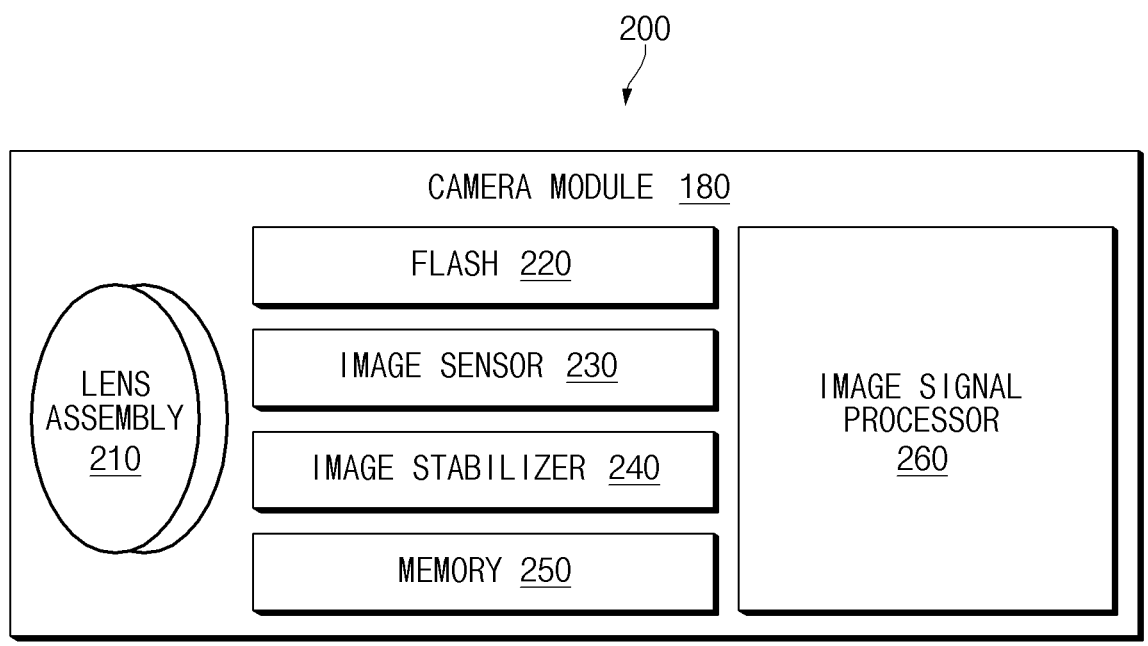
FIG. 2 is a block diagram illustrating a camera module, according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules180 may form a telephoto camera. Similarly, at least one of the plurality of camera modules 180 may form, for example, a front camera and at least another of the plurality of camera modules180 may form a rear camera.

Figure 3:
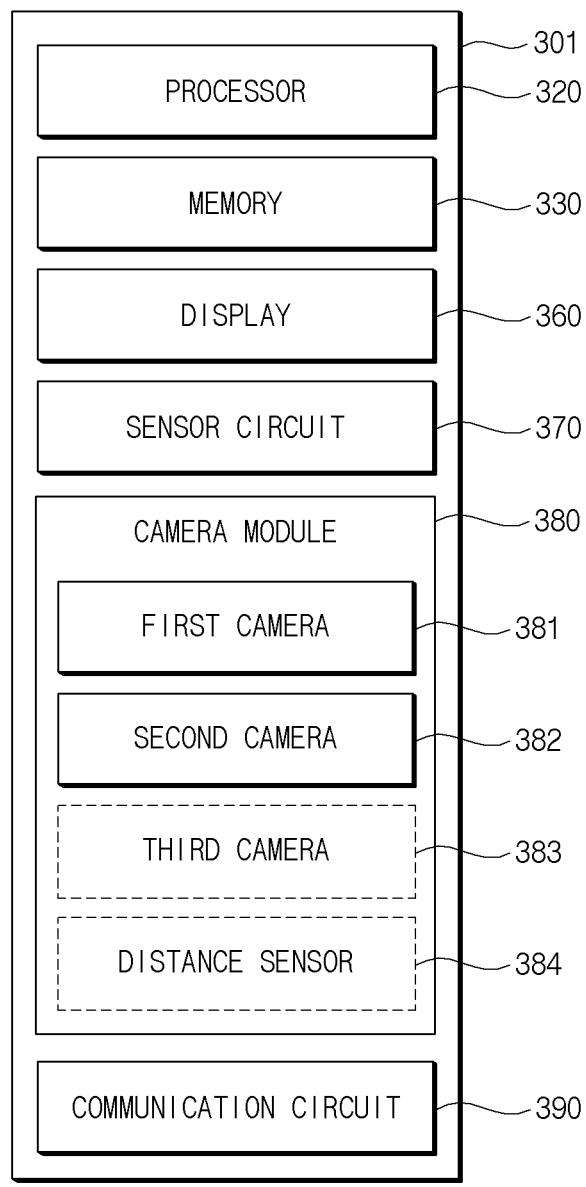
FIG. 3 illustrates a block diagram of an electronic device, according to an embodiment.

FIG. 3 is a block diagram of electronic devices, according to an embodiment. For clarity of description, descriptions the same as the above-mentioned descriptions may be briefly described or omitted.

Referring to FIG. 3, an electronic device 301 (e.g., the electronic device 101 of FIG. 1) may include a processor 320 (e.g., the processor 120 of FIG. 1), a memory 330 (e.g., the memory 130 of FIG. 1), a display 360 (e.g., the display module 160 of FIG. 1), a sensor circuit 370 (e.g., the sensor module 176 of FIG. 1), a camera module 380 (e.g., the camera module 180 of FIG. 1), and/or a communication circuit 390 (e.g., the communication module 190 of FIG. 1).

The electronic device 301 may further include at least one of additional components in addition to the components illustrated in FIG. 3. According to an embodiment, the components of the electronic device 301 may be the same entities or may constitute separate entities.

For example, the electronic device 301 may include a smartphone, a tablet PC, a wearable device, a home appliance, or a digital camera.

According to an embodiment, the processor 320 may be operatively connected to the memory 330, the display 360, the sensor circuit 370, the camera module 380, and the communication circuit 390. For example, the processor 320 may include one or more processors. For example, the one or more processors may include an image signal processor (ISP), an application processor (AP), or a communication processor (CP). The memory 330 may store one or more instructions that, when executed, cause the processor 320 to perform various operations of the electronic device 301.

Besides, the processor 320 may drive a module (e.g., a model selection module or an object size calculation module) by using executing instructions stored in the memory 330. An operation performed (or executed) by the module (e.g., a model selection module or an object size calculation module) may be understood as an operation performed by the processor 320 by executing instructions, which are stored in the memory 330, for the processor 320 to perform overall functions of the electronic device 301.

In an embodiment, an operation performed (or executed) by each of the module (e.g., a model selection module or an object size calculation module) may be implemented as at least part of the processor 320.

Several modules described in various embodiments of the disclosure may be implemented by hardware or software.

The display 360 may include a plurality of pixels. For example, the electronic device 301 may display an image obtained by using the camera module 380 on the display 360. The display 360 may include a touch screen capable of detecting a touch input. The electronic device 301 may identify an object in the displayed image based on an input to the display 360. For example, the user may set the corresponding object as an object-of-interest by performing a touch input to the displayed object.

The sensor circuit 370 may include at least one sensor (e.g., an acceleration sensor, an inertial sensor, and/or a gyro sensor) capable of detecting motion information of the electronic device 301. The electronic device 301 may detect the motion information of the electronic device 301 by using the sensor circuit 370 and then may control the camera module 380 based on the motion information and a movement of an object. For example, the electronic device 301 may move a lens of the second camera 382 based on the motion information of the electronic device 301 (e.g., a movement direction and a movement location).

The camera module 380 may include a plurality of cameras. For example, the camera module 380 may include a first camera 381 and the second camera 382. The camera module 380 may further include a configuration such as a third camera 383 and a distance sensor 384. The first camera 381 may have a first field of view (FOV). For example, the first camera 381 may include a wide-angle lens. The second camera 382 may have a second FOV. The second FOV may be narrower than the first FOV. For example, the second camera 382 may include a telephoto lens. The third camera 383 may have a third FOV. The third FOV may be wider than the first FOV. For example, the third camera 383 may include an ultra-wide-angle lens. The first camera 381, the second camera 382, and the third camera 383 may be positioned on the electronic device 301 so as to face the same direction with respect to the electronic device 301. For example, the first camera 381, the second camera 382, and the third camera 383 may be positioned on the rear surface of the electronic device 301. At least one of the first camera 381, the second camera 382, and the third camera 393 may include a configuration (e.g., OIS) for image stabilization.

The distance sensor 384 may include at least one sensor for measuring a distance between the camera module 380 and an object. For example, the distance sensor 384 may include a time of flight (ToF) sensor, a laser sensor, an infrared sensor, and/or a lidar sensor. The electronic device 301 may be configured to perform auto focusing (AF) by using the distance sensor 384. The electronic device 301 may perform AF by using the distance sensor 384 and may set the focused object as an object-of-interest.

The communication circuit 390 may be configured to support short-range wireless communication and/or long-range wireless communication. For example, the communication circuit 390 may support short-range wireless communication such as Bluetooth (e.g., Bluetooth legacy and/or Bluetooth low energy (BLE)), neighbor awareness network (NAN), Wi-Fi Direct, and/or ultra-wideband (UWB) communication.

The processor 320 may receive response data corresponding to a user input from an external server (not illustrated) or another electronic device (not illustrated) through the communication circuit 390. When receiving the response data, the processor 320 may allow an output device (e.g., the display 360) to output the response data. Alternatively, through the communication circuit 390, other devices may be controlled or data may be stored. The processor 320 may be composed of at least one or more processors, and may be driven while being physically divided into a main processor performing high-performance processing and an auxiliary processor performing low-power processing. Alternatively, one processor may process data by switching between a high performance mode and a low power mode depending on situations.

Hereinafter, an operation of the processor 320 will be described in detail.

According to an embodiment of the disclosure, the processor may obtain an image by using a camera, may identify an object-of-interest among objects included in the obtained image based on a size of the object-of-interest, may determine one segmentation model from among a plurality of segmentation models, and may drive the determined segmentation model.

According to an embodiment of the disclosure, the processor may calculate the size of the object-of-interest by calculating a ratio of the object-of-interest included in the obtained image and then may determine the segmentation model based on the calculated size.

According to an embodiment of the disclosure, the plurality of segmentation models may be segmentation models divided depending on a level of a label. The processor may determine the segmentation model based on the size of the object-of-interest.

According to an embodiment of the disclosure, the processor may output segmentation information about the image by driving the segmentation model.

According to an embodiment of the disclosure, the segmentation information may include at least one of a segmentation map or a segmentation image, which includes pixel-wise class information.

According to an embodiment of the disclosure, the plurality of segmentation models may include a first segmentation model including a label on the segmentation object, and a second segmentation model including a label obtained by subdividing a label on the object.

According to an embodiment of the disclosure, the processor may determine the segmentation model based on at least one of the type of the camera, a lens of the camera, magnification of the camera, a mode of the camera, shooting environment illuminance of the camera, a setting value of the camera, and a geographic location of the camera where an image is captured.

According to an embodiment of the disclosure, the processor may calculate a size occupied by the label size of the currently-running segmentation model among the total image and then may determine the segmentation model by comparing the calculated size with a threshold value.

According to an embodiment of the disclosure, the processor may determine the segmentation model depending on the image based on at least one of the type of the camera, a lens of the camera, magnification of the camera, a mode of the camera, shooting environment illuminance of the camera, a setting value of the camera, and a geographic location of the camera where an image is captured.

According to an embodiment of the disclosure, the plurality of segmentation models may further include a third segmentation model including a label obtained by subdividing a label included in at least one of the first segmentation model or the second segmentation model.

The configuration of the electronic device 301 illustrated in FIG. 3 is exemplary, and embodiments of the disclosure are not limited thereto. The electronic device 301 may further include a configuration (e.g., at least one of the configurations of the electronic device 101 of FIG. 1) not shown in FIG. 3. For example, the electronic device 301 may further include a battery and housing. Hereinafter, operations of the electronic device 301 may be described with reference to the configurations of the electronic device 301 described above with reference to FIG. 3. For example, operations of the electronic device 301 may be referred to as being performed by the processor 320.

Figure 4:
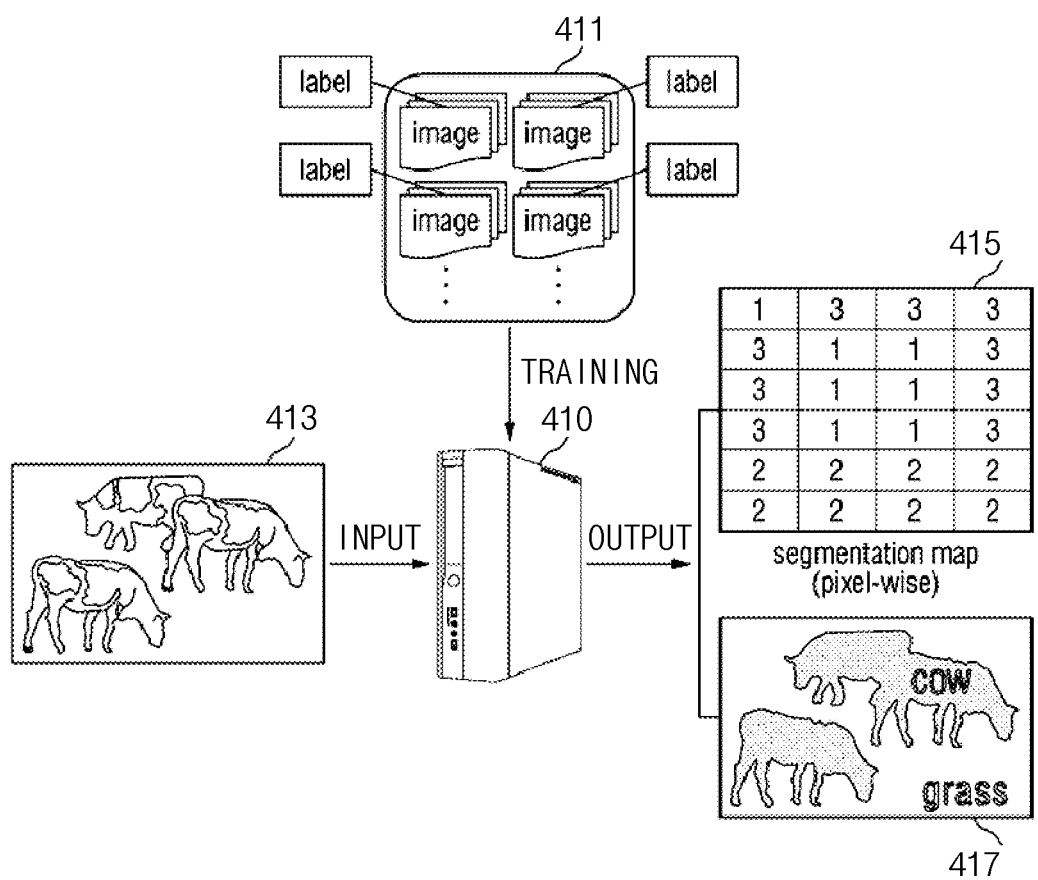
FIG. 4 is an exemplary diagram illustrating an electronic device and an environment, according to various embodiments of the disclosure.

FIG. 4 is an exemplary diagram illustrating an electronic device and an environment, according to various embodiments of the disclosure.

As shown in FIG. 4, an electronic device 410 may be a computing device capable of performing segmentation on an image. In more detail, the electronic device 410 may train a segmentation neural network by using a labeled image set 411. The segmentation neural network may mean a neural network used for segmentation. For example, the segmentation neural network may mean a neural network used for semantic segmentation. Semantic segmentation may include clustering parts of an image together which belong to the same object class. See a segmented image 417 of FIG. 4. In some embodiments, semantic segmentation is a form of pixel-level prediction in which each pixel in an image is classified according to a category. See a segmentation map 415 of FIG. 4. The segmentation neural network may be implemented as a neural network having various forms or structures, and thus the technical scope is not limited by the implementation method of the segmentation neural network.

The electronic device 410 may perform segmentation on an unlabeled image 413 by using the trained segmentation neural network. As a result of the execution, the electronic device 410 may output segmentation information (e.g., 415, 417) about an image. At this time, the segmentation information may be a segmentation map 415 or a segmented image 417, which includes pixel-wise class information, but is not limited thereto.

The electronic device 410 may be a laptop, a desktop, a laptop, a server, or the like but is not limited thereto. The electronic device 410 may include all types of devices equipped with computing functions. An example of the electronic device 410 is described with reference to FIG. 1. For example, the electronic device 410 may include a smartphone, a tablet PC, a wearable device, a home appliance, or a digital camera.

FIG. 1 illustrates that the electronic device 410 is implemented as one computing device. However, the first function of the electronic device 410 may be implemented by the first computing device. The second function of the electronic device 410 may be implemented by the second computing device. That is, the electronic device 410 may be composed of a plurality of computing devices. Besides, the plurality of computing devices may be implemented while the first function or the second function is divided.

The image set 411 is a training dataset composed of a plurality of images. A label for a segmentation object may be given in each image, and a segmentation neural network may be trained by using the given label.

The segmentation object may mean an object to be segmented. The class of the segmentation object may be predefined. A background may also be defined as a single segmentation object.

In various embodiments of the disclosure, the label of the image set 411 may include a label having at least one or more levels. For example, the image set 411 may include a first level segmentation label, a second level segmentation label, and a third level segmentation label. The electronic device 410 may create a separate segmentation model depending on a level of the label. Examples of segmentation models are U-Nets and various configurations of U-Nets. This will be described with reference to FIG. 5.

Figure 5:
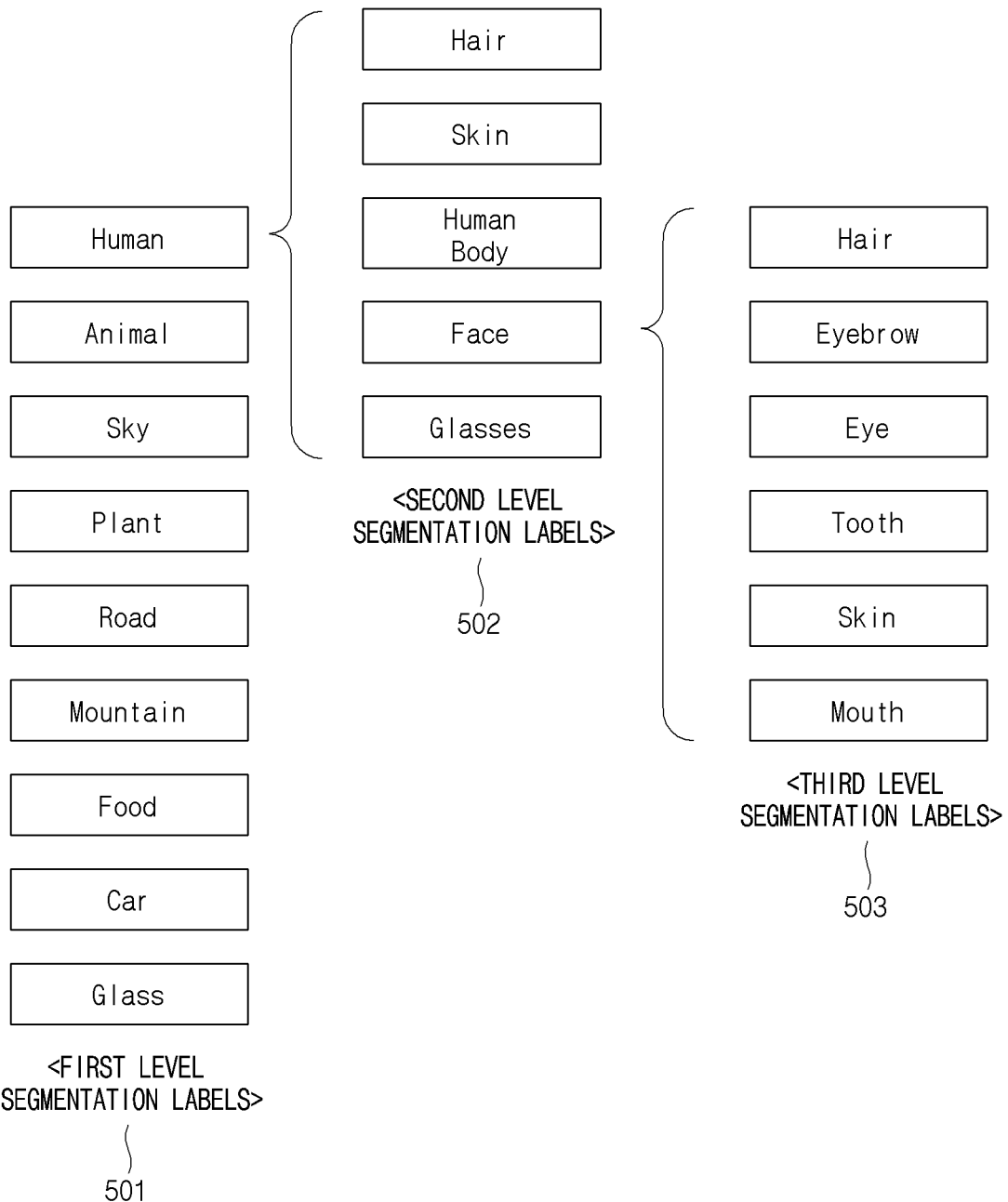
FIG. 5 is an exemplary diagram of a plurality of segmentation models, according to an embodiment.

FIG. 5 is an exemplary diagram of a plurality of segmentation models, according to an embodiment. Referring to FIG. 5, a first level segmentation 501 may be a label for a segmentation object. For example, the first level segmentation label 501 may include each label associated with a human, an animal, sky, a plant, a road, a mountain, food, a car, or glass.

A second level segmentation label 502 may include a label obtained by subdividing at least one or more labels among labels included in the first level segmentation label 501. For example, the second level segmentation label 502 may have a label obtained by subdividing the human label included in the first level segmentation label 501. In this case, the second level segmentation label 502 may include labels associated with hair, skin, a human body, a face, and glasses.

A third level segmentation label 503 may include a label obtained by subdividing at least one or more of the first level segmentation label 501 or the second level segmentation label 502. For example, the third level segmentation label 503 may include a label obtained by subdividing a label associated with a face included in the second level segmentation label 502. In this case, the third level segmentation label 503 may include labels associated with hair, an eyebrow, an eye, a tooth, skin, and a mouth.

In an embodiment, the first level segmentation label 501, the second level segmentation label 502, and the third level segmentation label 503 may be included in a first level segmentation model, a second level segmentation model, and a third level segmentation model, respectively.

The electronic device may drive only one model among the models, by being included in different segmentation models depending on a level of a label. Accordingly, the electronic device may efficiently process images. This will be described with reference to FIG. 6.

In general, embodiments include calculating the size of the object-of-interest by calculating a ratio of the object-of-interest to a total area of the image; and determining the segmentation model based on the ratio.

Also, the plurality of segmentation models, in a non-limiting example, are segmentation models divided depending on a level of a label. In some embodiments, a size of the object-of-interest is used to determine the segmentation model.

After applying the selected segmentation model, segmentation information about the image may be output. The segmentation information includes at least one of a segmentation map (for example, FIG. 4 segmentation map 415) or a segmentation image, and the segmentation information includes pixel-wise class information (for example, FIG. 4 segmentation image 417).

In some embodiments, the method further includes calculating the size based on a previous ROI, wherein a previously selected segmentation model is applied to the previous ROI; and determining the selected segmentation model by comparing the size with a threshold value.

In some embodiments, the plurality of segmentation models further includes a third segmentation model configured for use with a third segmentation object associated with a third label, wherein the third segmentation object is obtained by subdividing the first segmentation object or the second segmentation object.

Figure 6:
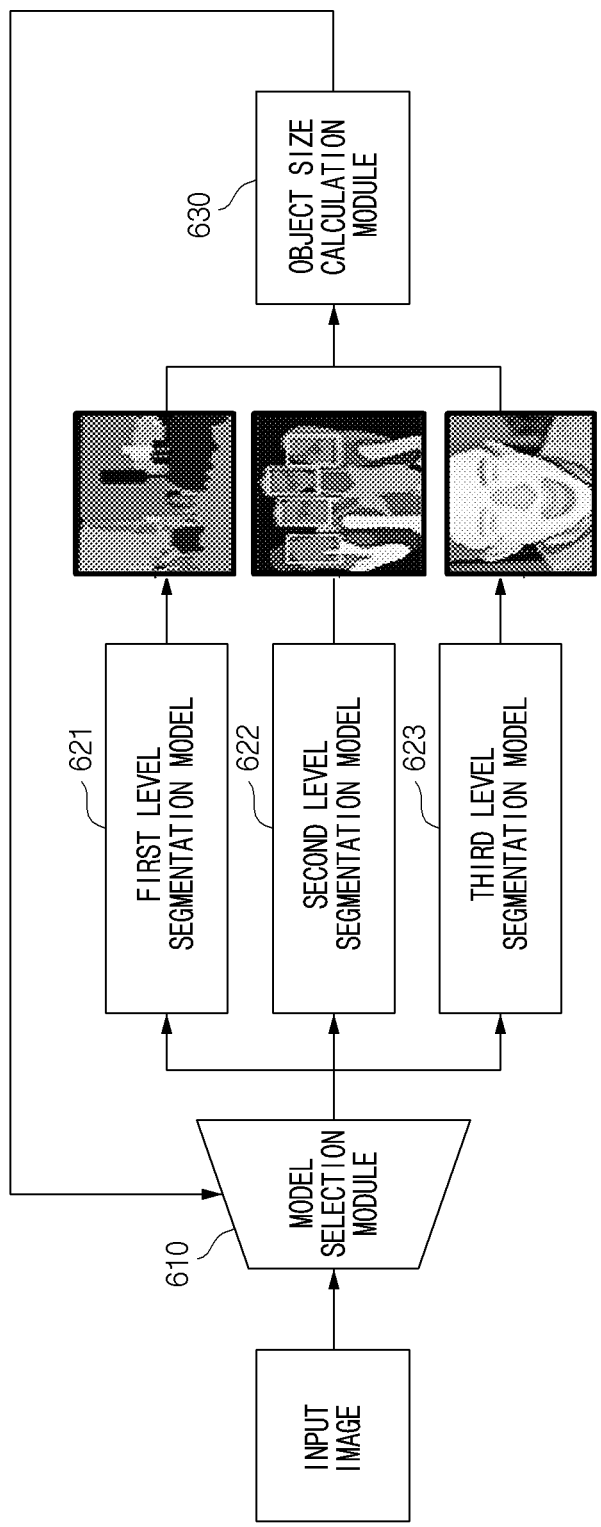
FIG. 6 is a conceptual diagram for describing a method of performing segmentation by an electronic device, according to an embodiment.

FIG. 6 is a conceptual diagram for describing a method of performing segmentation by an electronic device, according to an embodiment. For clarity of description, descriptions the same as the above-mentioned descriptions may be briefly described or omitted.

Referring to FIG. 6, a model selection module 610 may receive an input image. The model selection module 610 may receive model selection information determined by an object size calculation module 630. The model selection module 610 may determine segmentation models 621, 622, and 623, which are to be used in image processing of the input image, depending on the determined model selection information.

When there is no selection result of the object size calculation module 630, the model selection module 610 may determine a segmentation model, which is set by default, as a segmentation model to be used in image processing of the entered input image. For example, when there is no selection result of the object size calculation module 630, the model selection module 610 may determine the segmentation model set by default depending on at least one of the type of a camera, a lens of the camera, magnification of the camera, a mode of the camera, shooting environment illuminance of the camera, a setting value of the camera, and a geographic location of the camera where an image is captured.

The model selection module 610 may drive the determined segmentation model. This will be described in detail with reference to FIG. 8.

The object size calculation module 630 may select the type of the segmentation model to be used in the next image processing. For example, the object size calculation module 630 may select the type of the segmentation model to be used in the next image processing by calculating a ratio of a label size of the currently-running segmentation model to the total image.

In an embodiment, the object size calculation module 630 may receive the segmentation driving result of the input image as an input and then may calculate a size of a specific label in the input image.

In an embodiment, the object size calculation module 630 may identify the object-of-interest included in the obtained image and then may select the type of the segmentation model to be used in the next image processing based on the size of the identified object-of-interest. The object-of-interest may mean a segmentation object. In an embodiment, the object-of-interest may mean an object included in a region of interest (ROI). In some embodiments, semantic segmentation processes various discovered objects in an image by searching through the image, determining a segmentation model to be used on a segmentation object subdivided out of the image and producing a segmentation map or pixel map (for example, FIG. 4 items 415 and 417) as an output of the segmentation model applied to the segmentation object.

By the searching process, the plurality of segmentation models may include a third segmentation model configured for use with a third segmentation object associated with a third label, wherein the third segmentation object is obtained by subdividing the first segmentation object or the second segmentation object. For example, FIG. 6 items 621, 622 and 623 are three segmentation models. Item 621 is a segmentation model which processes a scene which includes a group of people and other objects assigning labels from item 501 of FIG. 5. Item 622 is a segmentation model which process a group of people assigning labels from item 502 of FIG. 5. Item 623 is a segmentation model which processes a face of one person in the group of people assigning labels from item 503 of FIG. 5.

The object size calculation module 630 may change the segmentation model to be executed next by comparing the calculated size with a threshold value. For example, the object size calculation module 630 may compare the calculated size with a first threshold value. When the calculated size is greater than the first threshold value, the object size calculation module 630 may change the segmentation model to be executed next to an upper-level segmentation model. The upper-level segmentation model may mean a segmentation model having a label obtained by subdividing at least one label included in the currently-running level segmentation model.

As another example, the object size calculation module 630 may compare the calculated size with a second threshold value. When the calculated size is less than the second threshold value, the object size calculation module 630 may change the segmentation model to be executed next to a lower-level segmentation model. The lower-level segmentation model may mean a model included in the currently-running level segmentation model including a label obtained by subdividing at least one label included in the lower-level segmentation model.

The threshold value may be changed consistently depending on at least one of the type of a camera capturing the input image, a lens of the camera, magnification of the camera, a mode of the camera, shooting environment illuminance of the camera, a setting value of the camera, and a geographic location of the camera where an image is captured. In an embodiment, the object size calculation module 630 may determine the threshold value.

The object size calculation module 630 may refer to an auxiliary data value calculated by a camera ISP. For example, the object size calculation module 630 may determine the threshold value with reference to face detection information, exposure information, or an ISO value as the auxiliary data value calculated by the camera ISP. This will be described in detail with reference to FIG. 9.

A plurality of segmentation models such as 621, 622 and 623 in FIG. 6 may include a first segmentation model configured for use with a first segmentation object associated with a first label, and a second segmentation model configured for use with a second segmentation object associated with a second label. The second segmentation object may be obtained by subdividing the first segmentation object. As mentioned above in the discussion of FIG. 5, a segmentation object may be an object in an image to be segmented. Training is performed using labelled segmentation objects (for example, FIG. 4 item 411).

Hereinafter, a method in which an electronic device according to an embodiment of the disclosure performs segmentation will be described with reference to FIGS. 7 to 9. Hereinafter, each operation of methods to be described may be performed by a computing device. For example, each operation of the methods may be implemented with one or more instructions executed by a processor of the computing device. All operations included in the methods may be executed by a single physical computing device. However, the first operations of the method are performed by a first computing device, and the second operations of the method may be performed by a second computing device. Besides, in a method according to an embodiment of the disclosure, the execution order of each operation may be changed within a range in which the execution order is capable of being logically changed as needed.

Figure 7:
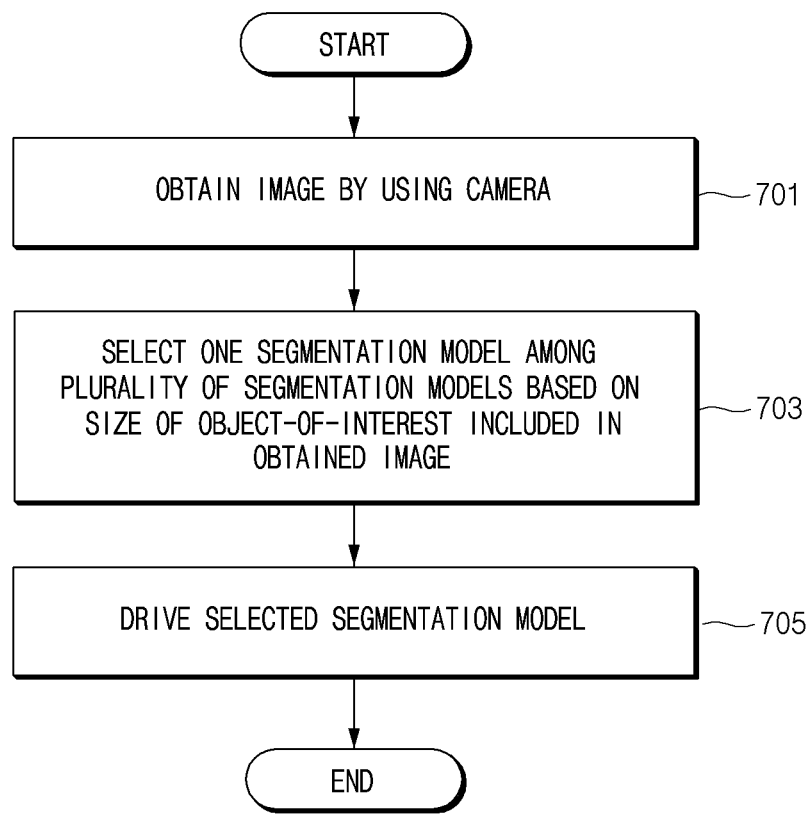
FIG. 7 is a flowchart of a method in which an electronic device drives a segmentation model, according to an embodiment.

FIG. 7 is a flowchart of a method in which an electronic device drives a segmentation model, according to an embodiment of the disclosure. According to an embodiment, it may be understood that the process illustrated in FIG. 7 is performed by a processor (e.g., the processor 120 of FIG. 1) of an electronic device (e.g., the electronic device 101 of FIG. 1) by executing instructions stored in a memory (e.g., the memory 130 of FIG. 1).

In operation 701, the electronic device may obtain an image by using a camera. The camera may mean a camera included in the electronic device or operatively connected to the electronic device. The electronic device may identify an object-of-interest included in the obtained image. The object-of-interest may mean a segmentation object. In an embodiment, the object-of-interest may mean an object included in an ROI.

In operation 703, the electronic device may select one segmentation model among a plurality of segmentation models based on the size of an object-of-interest included in the obtained image.

The plurality of segmentation models may mean segmentation models generated as separate models depending on a level of a label. Operation 703 will be described with reference to FIG. 9.

In operation 705, the electronic device may drive the selected segmentation model. This will be described in detail with reference to FIG. 8.

Figure 8:
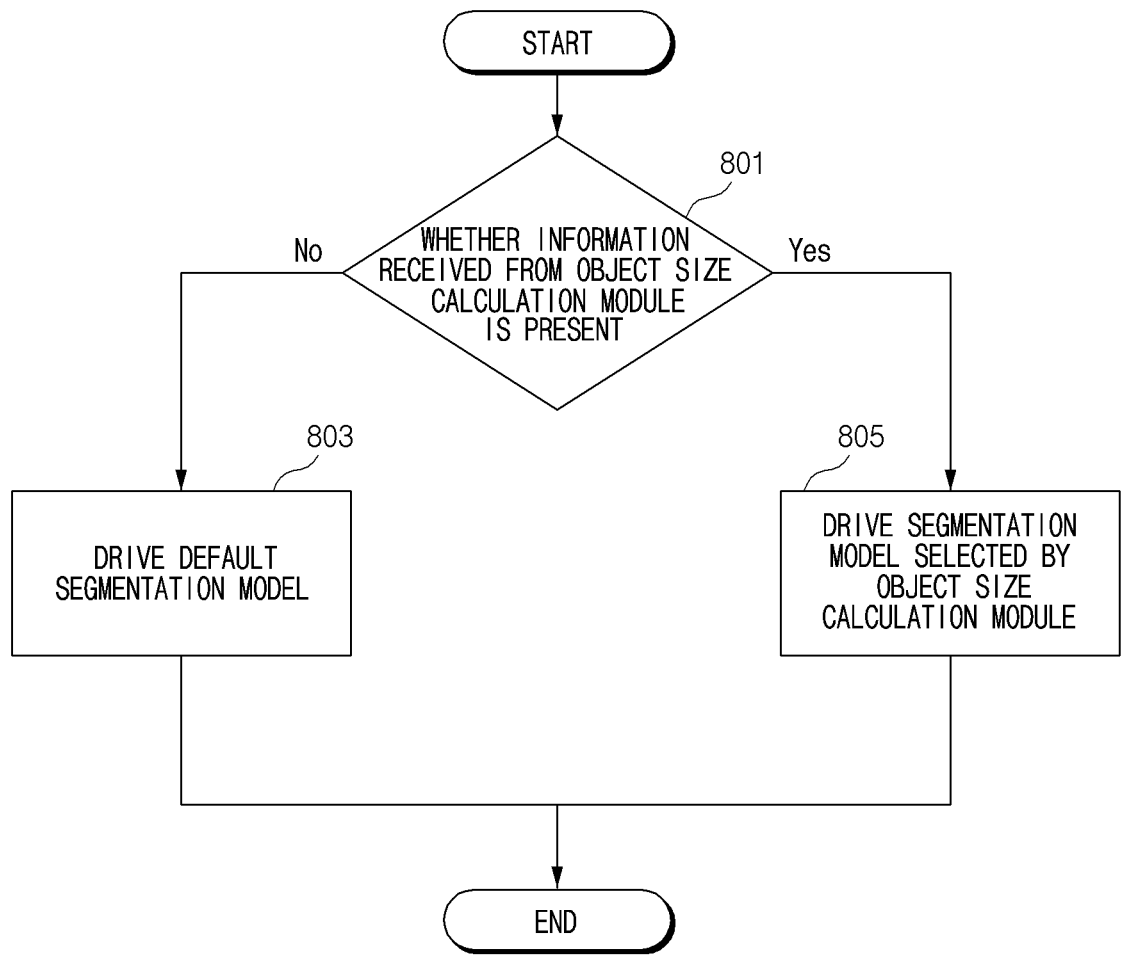
FIG. 8 is another flowchart of a method in which an electronic device drives a segmentation model, according to an embodiment.

FIG. 8 is another flowchart of a method in which an electronic device drives a segmentation model, according to an embodiment of the disclosure. According to an embodiment, it may be understood that the process illustrated in FIG. 8 is performed by a processor (e.g., the processor 120 of FIG. 1) of an electronic device (e.g., the electronic device 101 of FIG. 1) by executing instructions stored in a memory (e.g., the memory 130 of FIG. 1).

In operation 801, the electronic device may determine whether information received from an object size calculation module is present. The information may mean information about the segmentation model selected by the object size calculation module.

When the received information is present, in operation 805, the electronic device may drive the segmentation model selected by the object size calculation module. A method in which the object size calculation module selects a segmentation model will be described with reference to FIG. 9.

When the received information is not present, in operation 803, the electronic device may drive a segmentation model thus set by default. The default segmentation model may mean a segmentation model according to at least one of the type of a camera capturing an input image, a lens of the camera, magnification of the camera, a mode of the camera, shooting environment illuminance of the camera, a setting value of the camera, and a geographic location of the camera where an image is captured.

Figure 9:
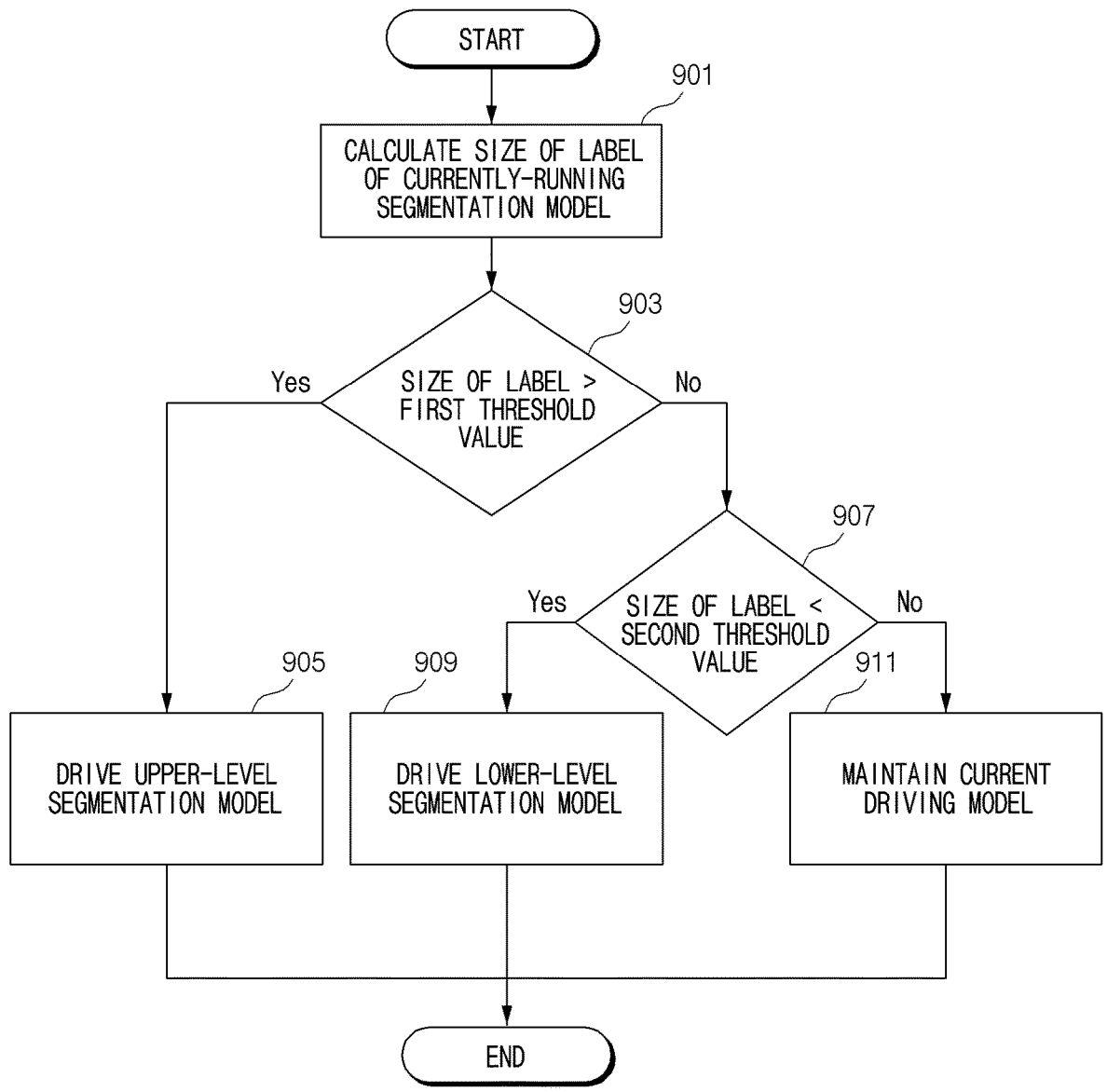
FIG. 9 is a flowchart of a method of selecting a segmentation model, according to an embodiment.

FIG. 9 is a flowchart of a method of selecting a segmentation model, according to an embodiment of the disclosure. According to an embodiment, it may be understood that the process illustrated in FIG. 9 is performed by a processor (e.g., the processor 120 of FIG. 1) of an electronic device (e.g., the electronic device 101 of FIG. 1) by executing instructions stored in a memory (e.g., the memory 130 of FIG. 1).

In operation 901, the electronic device may calculate a size of a label of the currently-running segmentation model. In an embodiment, the electronic device may calculate a ratio of the size of the label of the currently-running segmentation model to the total image.

In operation 903, the electronic device may determine whether the calculated size of the label is not less than a first threshold value. When it is determined that the size of the label is not less than the first threshold value, in operation 905, the electronic device may drive an upper-level segmentation model. The upper-level segmentation model may mean a segmentation model having a label obtained by subdividing at least one label included in the currently-running segmentation model. Referring to FIG. 6 as an example, in the case where the currently-running segmentation model is the second level segmentation model 622 in FIG. 6, when it is determined that the size of the label is not less than the first threshold value, the electronic device may drive the third level segmentation model 623 of FIG. 6, which is an upper-level segmentation model.

The first threshold value may be changed consistently depending on at least one of the type of a camera capturing the input image, a lens of the camera, magnification of the camera, a mode of the camera, shooting environment illuminance of the camera, a setting value of the camera, and a geographic location of the camera where an image is captured.

When it is determined that the size of the label is less than the first threshold value, in operation 907, the electronic device may determine whether the size of the label is not greater than a second threshold value. Moreover, the second threshold value may also be changed consistently depending on at least one of the type of a camera capturing the input image, a lens of the camera, magnification of the camera, a mode of the camera, shooting environment illuminance of the camera, a setting value of the camera, and a geographic location of the camera where an image is captured.

When it is determined that the size of the label is not greater than the second threshold value, in operation 909, the electronic device may drive a lower-level segmentation model. The lower-level segmentation model may mean a model included in the currently-running segmentation model including a label obtained by subdividing at least one label included in the lower-level segmentation model. Referring to FIG. 6 as an example, in the case where the currently-running segmentation model is the second level segmentation model 622 in FIG. 6, when it is determined that the size of the label is not greater than the second threshold value, the electronic device may drive the first level segmentation model 621 of FIG. 6, which is an lower-level segmentation model. On the other hand, when it is determined that the size of the label is greater than the second threshold value, in operation 911, the electronic device may maintain a current driving model. Referring to FIG. 6 as an example, in the case where the currently-running segmentation model is the second level segmentation model 622 in FIG. 6, when it is determined that the size of the label is greater than the second threshold value, the electronic device may drive the second level segmentation model 622 of FIG. 6, which is the current driving model.

According to an embodiment of the disclosure, a method performed by an electronic device may include obtaining an image by using a camera included in the electronic device or connected to the electronic device when a process for a memory included in the electronic device or connected to the electronic device is executed, identifying an object-of-interest among an object included in the obtained image, determining one segmentation model among a plurality of segmentation models based on a size of the object-of-interest, and driving the determined segmentation model.

According to an embodiment of the disclosure, the method performed by an electronic device may further include calculating the size of the object-of-interest by calculating a ratio of the object-of-interest included in the obtained image and determining the segmentation model based on the calculated size.

According to an embodiment of the disclosure, the plurality of segmentation models may be segmentation models divided depending on a level of a label. The method performed by an electronic device may further include determining the segmentation model based on the size of the object-of-interest.

According to an embodiment of the disclosure, the method performed by an electronic device may further include outputting segmentation information about the image by driving the segmentation model.

According to an embodiment of the disclosure, in the method performed by an electronic device, the segmentation information may include at least one of a segmentation map or a segmentation image, which includes pixel-wise class information.

According to an embodiment of the disclosure, in the method performed by an electronic device, the plurality of segmentation models may include a first segmentation model including a label on a segmentation object, and a second segmentation model including a label obtained by subdividing a label on the object.

According to an embodiment of the disclosure, the method performed by an electronic device may further include determining the segmentation model based on a type of the camera, a lens of the camera, magnification of the camera, a mode of the camera, shooting environment illuminance of the camera, a setting value of the camera, and a geographic location of the camera where an image is captured.

According to an embodiment of the disclosure, the method performed by an electronic device may further include calculating a size, which is occupied by a size of a label of a currently-running segmentation model, in a total image and determining the segmentation model by comparing the calculated size with a threshold value.

According to an embodiment of the disclosure, the method performed by an electronic device may further include determining the segmentation model depending on the image based on a type of the camera, a lens of the camera, magnification of the camera, a mode of the camera, shooting environment illuminance of the camera, a setting value of the camera, and a geographic location of the camera where an image is captured.

According to an embodiment of the disclosure, in the method performed by an electronic device, the plurality of segmentation models further include a third segmentation model including a label obtained by subdividing a label included in at least one of the first segmentation model or the second segmentation model.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising: a camera; a processor operatively connected to the camera; and a memory operatively connected to the processor, wherein the memory stores instructions that, when executed, cause the processor to: obtain an image by using the camera; identify an object-of-interest among a plurality of objects included in the image; calculate a size of the object-of-interest by calculating a ratio of an area occupied by the object-of-interest to a total area of the image; determine a level of a first segmentation model based on the object-of-interest, wherein the plurality of segmentation models are classified into a plurality of hierarchical levels based on at least one label included in the plurality of segmentation models; determine the first segmentation model among a plurality of segmentation models having the determined level based on the size of the object-of-interest; apply the first segmentation model to a region of interest (ROI) of the image containing the object-of-interest, when the ratio of an area occupied by the object-of-interest to a total area of the image is changed and the changed ratio is greater than or equal to a first threshold, apply a second segmentation model having higher level than the first segmentation model to the ROI; and when the ratio of an area occupied by the object-of-interest to a total area of the image is changed and the changed ratio is less than a second threshold that is lower than the first threshold, apply a third segmentation model having lower level than the first segmentation model to the ROI.

2. The electronic device of claim 1, wherein the plurality of segmentation models are segmentation models divided depending on a level of a label.

3. The electronic device of claim 1, wherein the instructions cause the processor to output segmentation information about the image after applying the first segmentation model.

4. The electronic device of claim 3, wherein the segmentation information includes at least one of a segmentation map or a segmentation image, and the segmentation information includes pixel-wise class information.

5. The electronic device of claim 1, wherein the first segmentation model is configured for use with a first segmentation object associated with a first label, a second segmentation model is configured for use with a second segmentation object associated with a second label, and a third segmentation model is configured for use with a third segmentation object associated with a third label, wherein the first segmentation object includes objects that subdivide the second segmentation object and the third segmentation object includes objects that subdivide the first segmentation object.

6. The electronic device of claim 1, wherein the instructions cause the processor to:
   determine the first segmentation model based on a type of the camera, a lens of the camera, magnification of the camera, a mode of the camera, shooting environment illuminance of the camera, a setting value of the camera, and a geographic location of the camera where the image is captured.

7. The electronic device of claim 1, wherein the instructions cause the processor to:
   determine the first segmentation model depending on the image based on a type of the camera, a lens of the camera, magnification of the camera, a mode of the camera, shooting environment illuminance of the camera, a setting value of the camera, and a geographic location of the camera where the image is captured.

8. A method performed by an electronic device, the method comprising: when a process for a memory included in the electronic device or connected to the electronic device is executed, obtaining an image by using a camera included in the electronic device or connected to the electronic device; identifying an object-of-interest among a plurality of objects included in the image; calculating a size of the object-of-interest by calculating a ratio of an area occupied by the object-of-interest to a total area of the image; determining a level of a first segmentation model based on the object-of-interest, wherein the plurality of segmentation models are classified into a plurality of hierarchical levels based on at least one label included in the plurality of segmentation models; determining the first segmentation model among a plurality of segmentation models based on the size of the object-of-interest; applying the first segmentation model to a region of interest (ROI) of the image containing the object-of-interest, when the ratio of an area occupied by the object-of-interest to a total area of the image is changed and the changed ratio is greater than or equal to a first threshold, applying a second segmentation model having higher level than the first segmentation model to the ROI; and when the ratio of an area occupied by the object-of-interest to a total area of the image is changed and the changed ratio is less than a second threshold that is lower than the first threshold, applying a third segmentation model having lower level than the first segmentation model to the ROI.

9. The method of claim 8, wherein the plurality of segmentation models are segmentation models divided depending on a level of a label.

10. The method of claim 8, comprising outputting segmentation information about the image after applying the first segmentation model.

11. The method of claim 10, wherein the segmentation information includes at least one of a segmentation map or a segmentation image, and the segmentation information includes pixel-wise class information.

12. The method of claim 8, wherein the first segmentation model is configured for use with a first segmentation object associated with a first label, a second segmentation model is configured for use with a second segmentation object associated with a second label, and a third segmentation model is configured for use with a third segmentation object associated with a third label, wherein the first segmentation object includes objects that subdivide the second segmentation object and the third segmentation object includes objects that subdivide the first segmentation object.

13. The method of claim 8, comprising:
determining the first segmentation model based on a type of the camera, a lens of the camera, magnification of the camera, a mode of the camera, shooting environment illuminance of the camera, a setting value of the camera, and a geographic location of the camera where the image is captured.

14. The method of claim 8, comprising:
determining the first segmentation model depending on the image based on a type of the camera, a lens of the camera, magnification of the camera, a mode of the camera, shooting environment illuminance of the camera, a setting value of the camera, and a geographic location of the camera where the image is captured.

* * * * *